US012196041B2

(12) United States Patent
Woodward et al.

(10) Patent No.: US 12,196,041 B2
(45) Date of Patent: Jan. 14, 2025

(54) CEILING LADDER, DEEP STEP AND METHOD

(71) Applicant: Werner Co., Greenville, PA (US)

(72) Inventors: Steve Woodward, Meadville, PA (US); Shannon Lessner, Madison, WI (US); Thomas Parker, Jamestown, PA (US)

(73) Assignee: Werner Co., Greenville, PA (US)

( * ) Notice: Subject to any disclaimer, the term of this patent is extended or adjusted under 35 U.S.C. 154(b) by 0 days.

(21) Appl. No.: 18/378,588

(22) Filed: Oct. 10, 2023

(65) Prior Publication Data

US 2024/0110442 A1 Apr. 4, 2024

Related U.S. Application Data

(63) Continuation of application No. 17/564,191, filed on Dec. 28, 2021, now abandoned, which is a
(Continued)

(51) Int. Cl.
*E06C 7/08* (2006.01)
*E04B 9/00* (2006.01)
(Continued)

(52) U.S. Cl.
CPC ................ *E06C 7/08* (2013.01); *E04B 9/003* (2013.01); *E04F 11/064* (2013.01);
(Continued)

(58) Field of Classification Search
CPC . E06C 7/08; E06C 1/393; E06C 7/165; E06C 1/383; E04B 9/003; E04F 11/064; E04F 11/104; E04F 11/112
(Continued)

(56) References Cited

U.S. PATENT DOCUMENTS 335,051 A * 1/1886 Aryes ..................... E06C 7/165
182/120
872,165 A 11/1907 Henry
(Continued)

FOREIGN PATENT DOCUMENTS

CA 2815004 A1 11/2014
CA 2881525 A1 * 9/2015 ............ E06C 1/393
(Continued)

OTHER PUBLICATIONS

Sunset Ladder & Scaffold Blog, What are Ladder Duty Ratings and Ladder Load Capacities? , 2017, Jun. 5, 2017, 8 pp.
(Continued)

*Primary Examiner* — Robert Canfield
(74) *Attorney, Agent, or Firm* — Fitch, Even, Tabin & Flannery LLP

(57) ABSTRACT

A ceiling ladder having a plurality of sections that can be climbed by a user when in an unfolded position into an attic and that can be folded together into a retracted position to be stored above the ceiling. The ladder has a deep step, which has a width greater than the width of other steps of the ladder, in which is located between about 2-5 feet from the floor when the ladder is in the unfolded position so that a user can stand on the deep step and place objects into the attic without having to climb into the attic.

18 Claims, 6 Drawing Sheets

Related U.S. Application Data continuation of application No. 16/746,395, filed on Jan. 17, 2020, now Pat. No. 11,215,010, which is a continuation of application No. 15/591,799, filed on May 10, 2017, now Pat. No. 10,538,966.

(51) Int. Cl.

| | |
|---|---|
| ***E04F 11/06*** | (2006.01) |
| ***E04F 11/104*** | (2006.01) |
| ***E04F 11/112*** | (2006.01) |
| ***E06C 1/393*** | (2006.01) |
| ***E06C 7/16*** | (2006.01) |
| *E06C 1/383* | (2006.01) |

(52) U.S. Cl.
CPC ........... *E04F 11/104* (2013.01); *E04F 11/112* (2013.01); *E06C 1/393* (2013.01); *E06C 7/165* (2013.01); *E06C 1/383* (2013.01)

(58) Field of Classification Search
USPC .......... 182/194, 220; 52/182, 184, 186, 636, 52/650.1, 838, 846
See application file for complete search history.

(56) References Cited

U.S. PATENT DOCUMENTS 1,045,957 A 12/1912 William
1,784,413 A 12/1930 Bauer
1,820,315 A * 8/1931 Miller .................... E06C 7/165 182/152
1,920,552 A * 8/1933 Dollerhide ................ E06C 7/16 248/238
2,486,783 A * 11/1949 Hartman ................. E06C 7/165 182/120
2,528,317 A * 10/1950 Newman ................... E06C 7/08 182/120
2,649,237 A * 8/1953 Bjorklund ............. E04F 11/064 182/98
2,650,749 A 9/1953 Balogh
2,730,412 A * 1/1956 Yoder ....................... E06C 1/38 182/120
2,805,104 A * 9/1957 Ross ....................... E06C 7/165 182/120
2,975,857 A 3/1961 Suroff
2,989,141 A 6/1961 Howard
3,091,313 A * 5/1963 Colbath .................... E04B 5/10 52/691
3,112,811 A 12/1963 Moran
3,115,214 A * 12/1963 Roberts ................... E06C 7/165 182/120
3,276,543 A 10/1966 Kanoza
3,294,197 A * 12/1966 Kwiatkowski ............ E06C 7/16 182/120
3,901,353 A 8/1975 Skolnik
4,027,741 A 6/1977 Derrick
4,256,200 A * 3/1981 Loix ......................... E06C 1/12 182/162
4,332,308 A * 6/1982 Larson ...................... E06C 7/16 182/120
4,421,206 A 12/1983 Walter
4,541,508 A * 9/1985 Lundh ................... E04F 11/064 182/78
4,549,632 A 10/1985 Inoue
4,804,063 A 2/1989 Farris
5,050,706 A 9/1991 Cole
5,056,620 A 10/1991 Zumwalt
5,779,208 A * 7/1998 McGraw ................. E06C 7/165 182/120
6,786,300 B1 * 9/2004 Bonifacini ............. E06C 7/165 182/120
6,802,393 B2 10/2004 Zheng
6,991,063 B2 1/2006 Latimer
6,994,184 B2 * 2/2006 Latimer .................... E06C 1/54 182/95
7,108,103 B2 9/2006 Meeker
7,578,371 B2 8/2009 Allred, III
7,621,374 B2 11/2009 Richey
7,931,123 B2 4/2011 Moldthan
8,381,875 B2 2/2013 Leng
D683,479 S 5/2013 Magnus
8,499,511 B2 * 8/2013 Platt ........................ E04C 3/294 52/220.8
8,579,081 B2 11/2013 Richey
8,657,070 B2 2/2014 O'Brien
8,668,049 B2 3/2014 Leng
8,727,074 B1 5/2014 Bhajan
8,820,034 B1 * 9/2014 Watts ........................ E04C 3/16 52/404.3
9,422,767 B2 8/2016 Russell
9,435,126 B2 9/2016 Kasinski
9,677,336 B2 6/2017 Najey
9,695,630 B1 7/2017 Arthur
9,890,589 B2 * 2/2018 Goodnow ................. E06C 7/16
10,006,248 B2 6/2018 Goodnow
10,012,022 B1 7/2018 Stentiford, Sr.
10,151,144 B2 12/2018 Mora
10,352,098 B2 7/2019 Frensley
10,538,966 B2 1/2020 Woodward
10,648,234 B2 5/2020 Skubic
10,876,355 B2 12/2020 Mora
10,876,356 B2 12/2020 Russell
11,215,010 B2 1/2022 Woodward
11,274,495 B2 3/2022 Garay
2005/0029044 A1 2/2005 Brett
2007/0034450 A1 * 2/2007 Richey .................. E04F 11/064 182/77
2007/0181364 A1 8/2007 Lair
2007/0181369 A1 8/2007 Gibson
2007/0240935 A1 * 10/2007 O'Brien .................. E06C 7/165 182/120
2008/0060874 A1 3/2008 Lair
2008/0179137 A1 * 7/2008 Latimer ................ F16F 9/0254 182/77
2009/0032334 A1 * 2/2009 Moldthan ................. E06C 7/14 182/118
2011/0297482 A1 * 12/2011 O'Brien .................. E06C 7/165 182/129
2012/0199417 A1 * 8/2012 Richey .................... E06C 1/383 182/129
2013/0048429 A1 2/2013 Lonergan
2013/0256057 A1 * 10/2013 Kasinski ............... E04F 11/064 182/81
2014/0196388 A1 * 7/2014 Kasinski ............... E04F 11/062 52/186
2014/0224585 A1 8/2014 Russell
2014/0326538 A1 * 11/2014 Najey ....................... E06C 7/08 182/129
2015/0090533 A1 4/2015 Moss
2016/0076304 A1 * 3/2016 Smith ....................... E06C 7/08 182/18
2016/0376844 A1 * 12/2016 Najey ..................... E06C 7/165 182/120
2017/0167198 A1 * 6/2017 Goodnow ................. E06C 7/16
2018/0163468 A1 6/2018 Mora
2018/0171714 A1 6/2018 Dings
2018/0347278 A1 12/2018 Russell
2019/0063073 A1 2/2019 Woodward
2019/0100963 A1 4/2019 Mora
2020/0149347 A1 5/2020 Woodward
2021/0115732 A1 4/2021 Mora
2021/0222492 A1 * 7/2021 Moss ........................ E06C 1/20
2022/0120137 A1 4/2022 Woodward
2022/0154530 A1 5/2022 Barker

FOREIGN PATENT DOCUMENTS

CA 2895601 A1 12/2016
CA 2947548 A1 * 10/2017 ............... E04B 1/76
CA 3004242 A1 * 11/2018 ............ E04B 9/003
CH 683445 A5 3/1994

(56) References Cited

FOREIGN PATENT DOCUMENTS

| | | | | | |
|---|---|---|---|---|---|
| CN | 2854041 | Y | | 1/2007 | |
| CN | 101611238 | A | | 12/2009 | |
| CN | 105781407 | | | 7/2016 | |
| CN | 207245609 | | | 4/2018 | |
| DE | 29710802 | | | 10/1997 | |
| DE | 202019004166 | U1 | * | 4/2020 | |
| DE | 202020002721 | U1 | * | 12/2020 | |
| DE | 102019118191 | | | 1/2021 | |
| EP | 0106583 | A3 | | 7/1984 | |
| EP | 1607570 | A2 | * | 12/2005 | E06C 1/12 |
| EP | 2578768 | A2 | * | 4/2013 | E04F 11/064 |
| EP | 3109395 | | | 12/2016 | |
| EP | 3112579 | A1 | | 1/2017 | |
| EP | 3524769 | | | 8/2019 | |
| EP | 3604730 | A1 | | 2/2020 | |
| ES | 1057792 | | | 9/2004 | |
| FR | 2589515 | | | 5/1987 | |
| FR | 2862679 | | | 5/2005 | |
| FR | 2916794 | A1 | | 12/2008 | |
| FR | 2970017 | A1 | | 7/2012 | |
| GB | 441140 | | | 1/1936 | |
| GB | 2128239 | A | * | 4/1984 | E06C 7/16 |
| KR | 200172233 | Y1 | | 3/2000 | |
| KR | 200313910 | | | 5/2003 | |
| KR | 200409710 | | | 3/2006 | |
| PL | 220639 | | | 11/2015 | |
| PL | 228252 | | | 3/2018 | |
| PL | 229816 | | | 8/2018 | |
| WO | 9003487 | | | 4/1990 | |
| WO | 2005054595 | | | 6/2005 | |
| WO | 2011087386 | A1 | | 7/2011 | |
| WO | WO-2011087385 | A2 | * | 7/2011 | E04F 11/064 |
| WO | WO-2015048271 | A1 | * | 4/2015 | E06C 1/16 |
| WO | WO-2016040648 | A1 | * | 3/2016 | E06C 7/003 |

OTHER PUBLICATIONS

U.S. Patent and Trademark Office, Non-Final Office Action issued in U.S. Appl. No. 17/564,191, filed Oct. 21, 2022, 9 pp.

USPTO; U.S. Appl. No. 17/134,078; Non-Final Rejection mailed Jul. 25, 2023; (pp. 1-9).

USPTO; U.S. Appl. No. 17/564,191; Non-Final Rejection mailed Jul. 11, 2023; (pp. 1-15).

* cited by examiner

CEILING LADDER, DEEP STEP AND METHOD

CROSS-REFERENCE TO RELATED APPLICATIONS

This application is a continuation of U.S. patent application Ser. No. 17/564,191 filed Dec. 28, 2021, which is a continuation of U.S. patent application Ser. No. 16/746,395 filed Jan. 17, 2020, now U.S. Pat. No. 11,215,010 issued Jan. 4, 2022, which is a continuation of U.S. patent application Ser. No. 15/591,799 filed May 10, 2017, now U.S. Pat. No. 10,538,966 issued Jan. 21, 2020, all of which are incorporated by reference herein.

FIELD OF THE INVENTION

The present invention is related to a ceiling ladder that has a deep step with a width greater than the width of other steps, ceiling ladder. (As used herein, references to the "present invention" or "invention" relate to exemplary embodiments and not necessarily to every embodiment encompassed by the appended claims.) More specifically, the present invention is related to a ceiling ladder that has a deep step with a width greater than the width of other steps, ceiling ladder where the ladder has a plurality of sections in the sections are able to fold together and be stored above the ceiling without the deep step interfering with the sections when they fold together.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Ceiling ladders, also called attic ladders or sometimes access ladders, commonly are fixed to the ceiling and extends down from the ceiling so a user can climb the ladder into a room or space above the ceiling, such as an attic. For convenience and efficiency, the ceiling ladders are formed of sections which can be folded together and stored above the ceiling when not needed. There are times when the ladder extends down from the ceiling that the user only climbs part way up the ladder, far enough to simply place objects into the attic without actually having to climb all the way up the ladder into the attic. It would be safer for the user to stand on a step of the ceiling ladder whose width is as large as possible when only partly climbing the ladder to place objects in the attic.

BRIEF SUMMARY OF THE INVENTION

The present invention pertains to a ceiling ladder. The ladder comprises a frame adapted to fit into the ceiling. The ladder comprises a door that fits into the frame. The ladder comprises a top section fixed to the door having a right top rail, a left top rail in parallel with and opposing the right top rail, and a plurality of top steps having a width attached to the right and left rails. The ladder comprises a second section rotatably attached to the top section having a right second rail, a left second rail in parallel with and opposing the right second rail, and a plurality of second steps attached to the right second rail and the left second rail. At least one of the second steps being a deep step having a width at least 1.5 inches longer than a width of at least another one of the second steps. The right top rail connected by a first hinge to the right second rail and the left top rail connected to the left second rail by a second hinge so the second section can fold onto the top section into a folded position; and unfold from the top section into and unfolded position. The ladder comprises a third section rotatably attached to the second section having a right third rail, a left third rail in parallel with and opposing the right third rail, and a plurality of third steps having a width attached to the right third rail and the left third rail. The right second rail connected by a third hinge to the right third rail and the left second rail connected to the left third rail by a fourth hinge so the third section can fold onto the second section into the folded position and the door can be closed into the frame with the top and second and third sections disposed above the ceiling, and unfold from the second section into the unfolded position. When in the unfolded position, the top and second and third sections align to form the ladder on which a user can climb reach the ceiling with the deep step located 2-5 feet below the ceiling. When in the folded position, the deep step fits between the top steps of the third section.

The present invention pertains to a deep step for a ceiling ladder. The ceiling ladder having a plurality of sections with a top section rotatably attached to the ceiling and a second section rotatably attached to the top section. The second section having a plurality of steps attached to a second right rail and a second left rail of the second section, with the deep step being one of the plurality of steps. The deep step comprises preferably a one-piece extrusion comprising a first flange whose right side is fastened to and inside of a front flange of the second right rail and whose left side is fastened to and inside of a front flange of the second left rail. The one-piece extrusion comprises a front horizontal portion that extends essentially at a right angle from a top of the front flange. The one-piece extrusion comprises a second flange which extends essentially at a right angle down from the front horizontal portion and whose right side is fastened to an inside of a rear flange of the second right rail and whose left side is fastened to an inside of a rear flange of the second left rail. The one-piece extrusion comprises arear horizontal portion that extends from the front horizontal portion in a coplanar manner and from the second flange at essentially a right angle, and between and behind the second right rail and the second left rail, with the rear horizontal portion having a length which is shorter than a length of the front horizontal portion and a length of the second flange.

The present invention pertains to a method for placing objects above a ceiling from a floor. The method comprises unfolding a plurality of sections of a ladder having steps, which is attached to the ceiling, so a user can climb the ladder to above the ceiling from the floor. There is the step of a user climbing the ladder and standing on a deep step of the ladder with an object, which is located between about 2 feet and 5 feet above the floor and below the ceiling. The deep step having a width that is at least 1.5 inches longer than a width of other steps of the ladder. There is the step of the user placing the object above the ceiling while standing on the deep step. There is the step of the user climbing down off the ladder onto the floor. There is the step of the user folding the sections of the ladder together into a retracted position. There is the step of moving the sections of the ladder in the retracted position above the ceiling.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1:
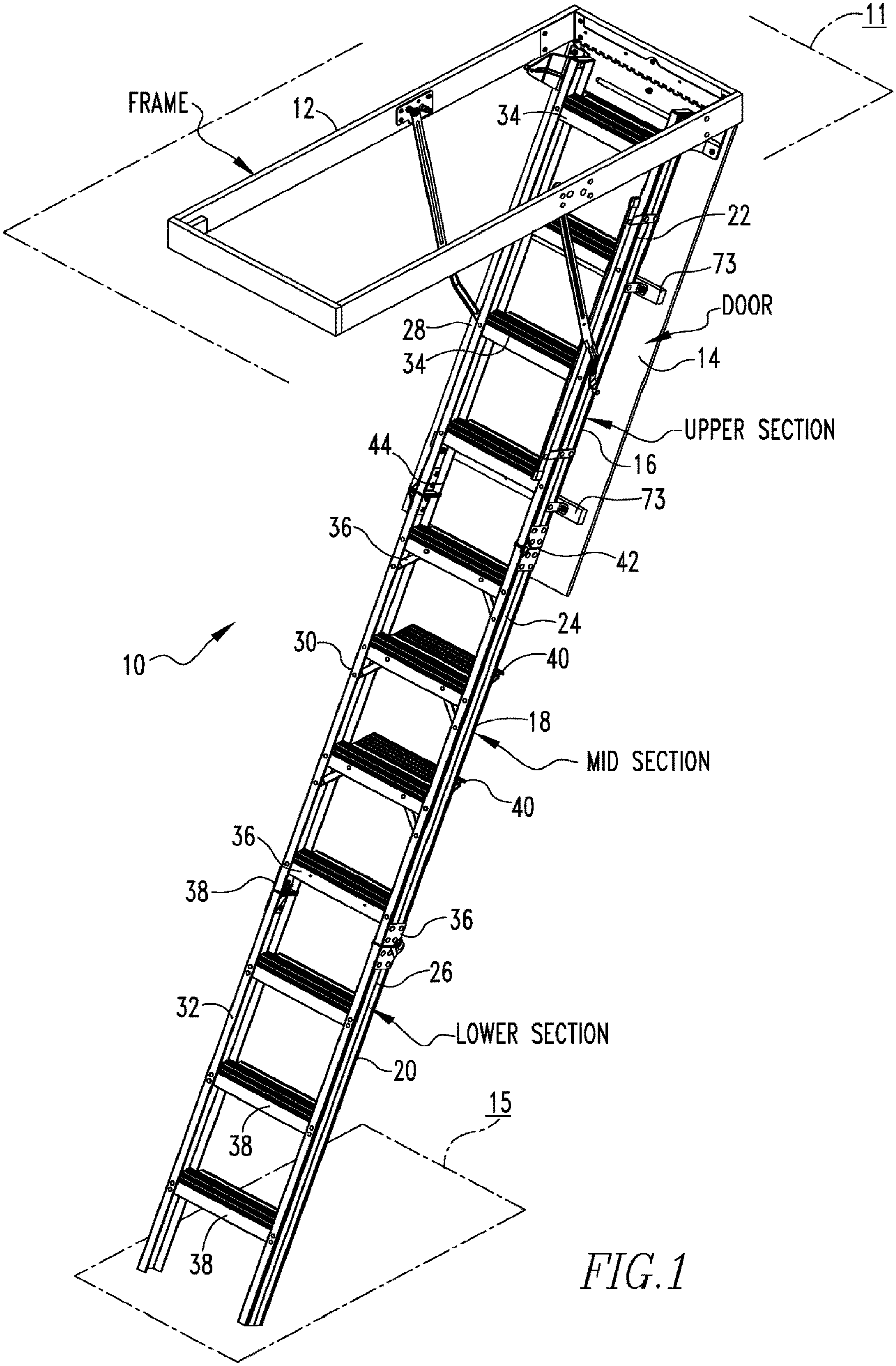
FIG. 1 is a perspective view of the ceiling ladder of the present invention in an unfolded position.
Figure 6:
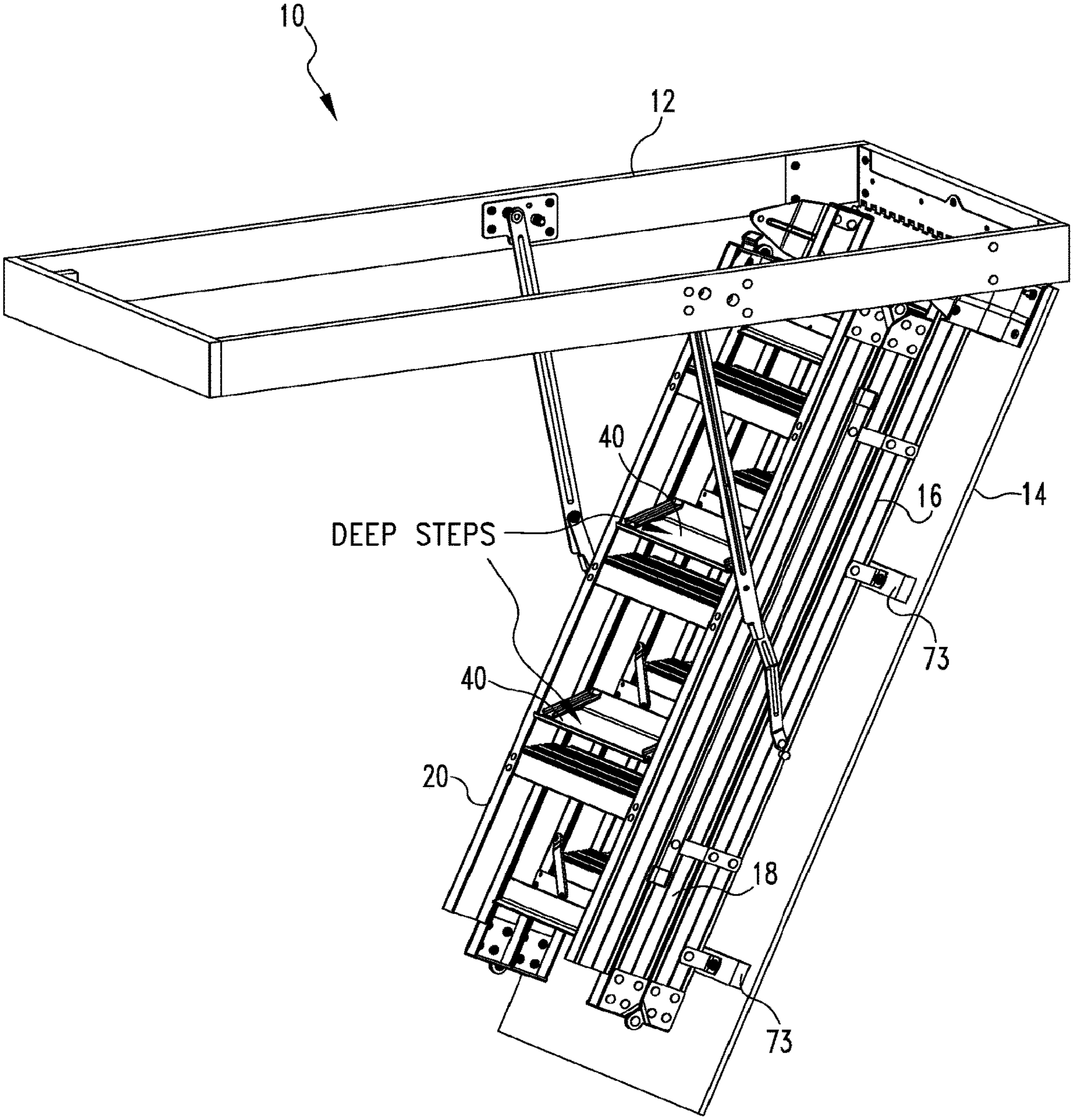
FIG. 6 is a perspective view of the ceiling ladder in a folded position.

Referring now to the drawings wherein like reference numerals refer to similar or identical parts throughout the several views, and more specifically to FIG. 1 thereof, there is shown a ceiling ladder 10. The ladder 10 comprises a frame 12 adapted to fit into the ceiling 11. The ladder 10 comprises a door 14 that fits into the frame 12. The ladder 10 comprises a top section 16 fixed to the door 14 having a right top rail 22, a left top rail 28 in parallel with and opposing the right top rail 22, and a plurality of top steps 34 having a width attached to the right and left rails. The ladder 10 comprises a second section 18 rotatably attached to the top section 16 having a right second rail 24, a left second rail 30 in parallel with and opposing the right second rail 24, and a plurality of second steps 36 attached to the right second rail 24 and the left second rail 30. At least one of the second steps 36 being a deep step 40 having a width at least 1.5 inches longer than a width of at least another one of the second steps 36. The right top rail 22 connected by a first hinge 42 to the right second rail 24 and the left top rail 28 connected to the left second rail 30 by a second hinge 44 so the second section 18 can fold onto the top section 16 into a folded position; and unfold from the top section 16 into and unfolded position. The ladder 10 comprises a third section 20 rotatably attached to the second section 18 having a right third rail 26, a left third rail 32 in parallel with and opposing the right third rail 26, and a plurality of third steps 38 having a width attached to the right third rail 26 and the left third rail 32. The right second rail 24 connected by a third hinge 46 to the right third rail 26 and the left second rail 30 connected to the left third rail 32 by a fourth hinge 48 so the third section 20 can fold onto the second section 18 into the folded position and the door 14 can be closed into the frame 12 with the top and second and third sections 16, 18, 20 disposed above the ceiling, and unfold from the second section 18 into the unfolded position. When in the unfolded position, the top and second and third sections 16, 18, 20 align to form the ladder 10 on which a user can climb reach the ceiling with the deep step 40 located 2-5 feet below the ceiling. When in the folded position, the deep step 40 fits between the top steps 34 of the third section 20, as shown in FIG. 6.

Figure 3:
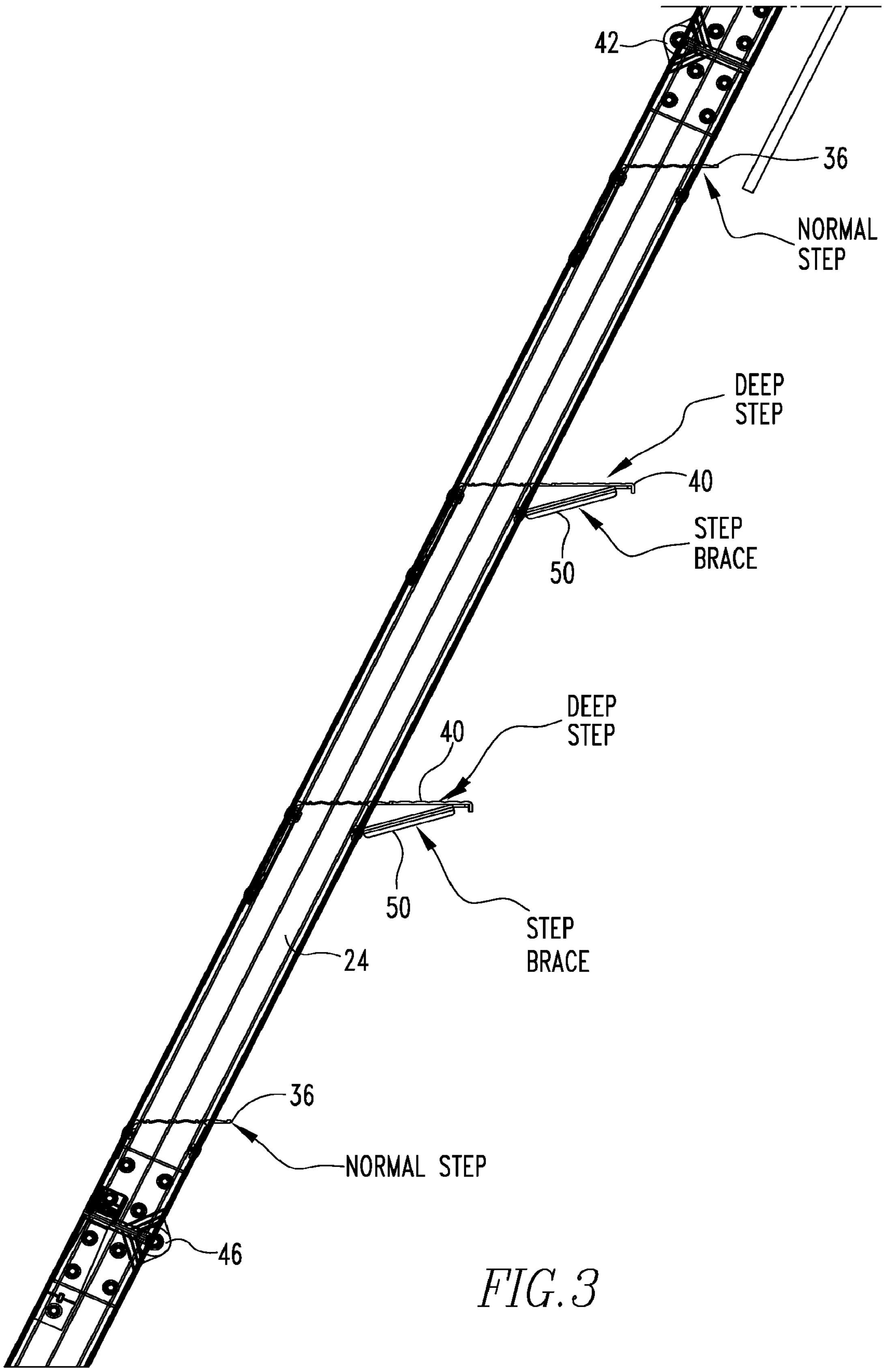
FIG. 3 is a side view of the second section.
Figure 5:
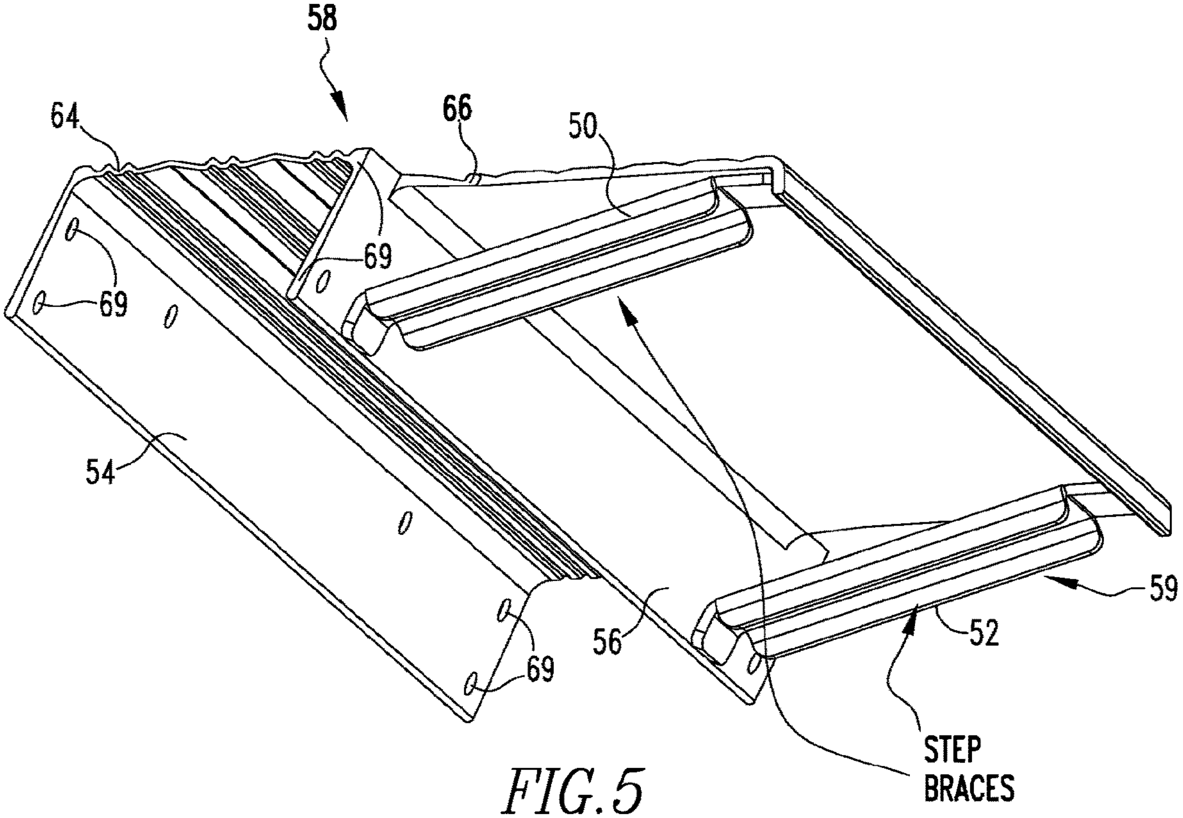
FIG. 5 is an underside perspective view of the deep step.
Figure 7:
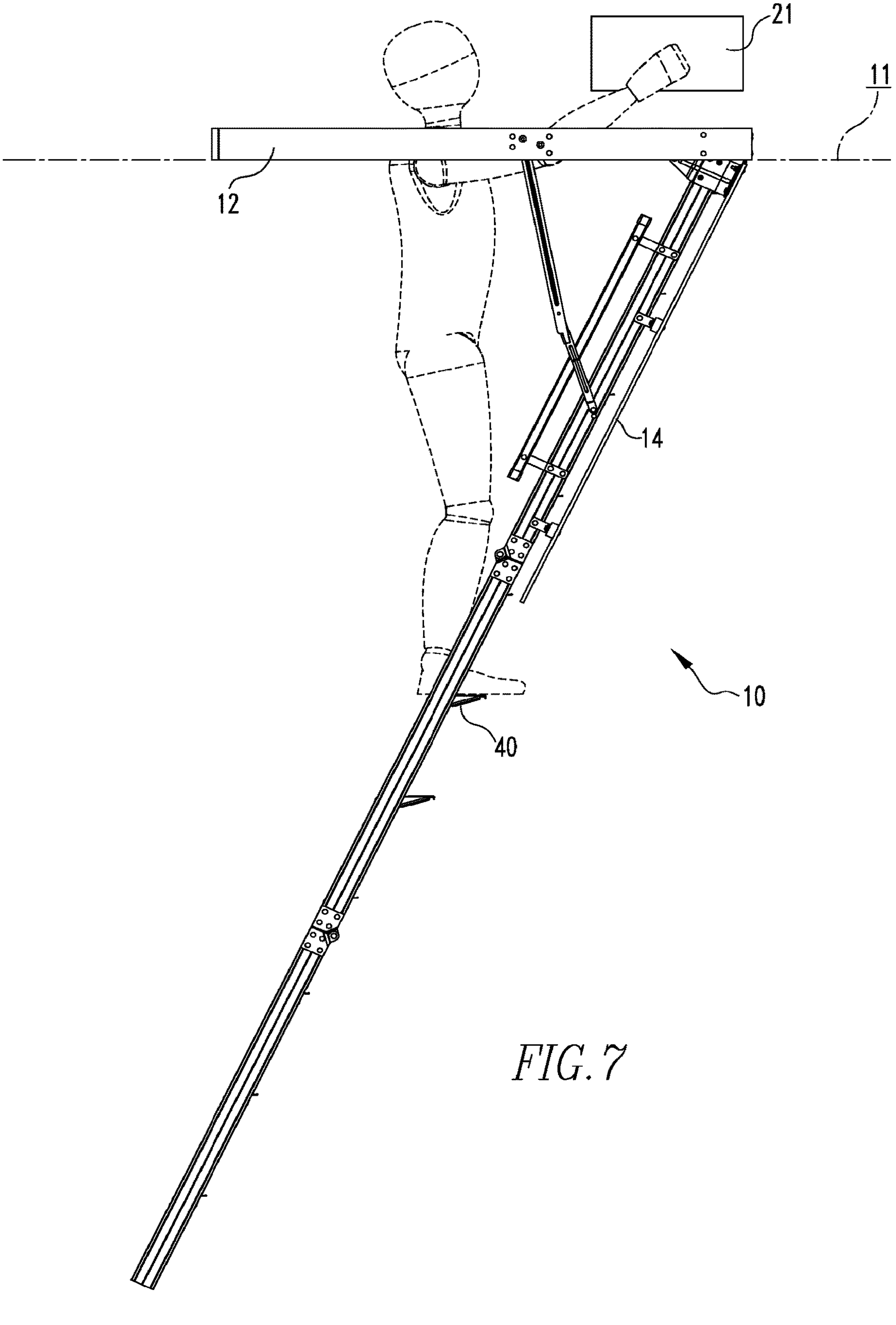
FIG. 7 is a representation of a user standing on a deep step placing a box above the ceiling

Ceiling or attic ladders have steps which are all the same width (side to side) and the same depth or length (front to rear). These uniform steps are designed to allow the user to simply climb up into and down from an overhead space. But in actual use, often the user will pause when partway up the ladder 10 in order to move objects 21, packages, etc., into and out of the attic, as shown in FIG. 7. Having deeper steps 40 at the height where a user is likely to pause makes standing there safer and more comfortable The deep step 40 may be fixed in place between the second right rail and the second left rail. As shown in FIGS. 3 and 5, the ladder 10 may include a first brace or first arm 50 which extends from a rear of the deep step 40 that is located behind the second right rail and the second left rail, to the second right rail to transfer loads on the deep step 40 to the second right rail. The ladder IO may include a second brace or second arm 52 which extends from the rear of the deep step 40 to the second left rail to transfer loads on the deep step 40 to the second left rail.

Figure 2:
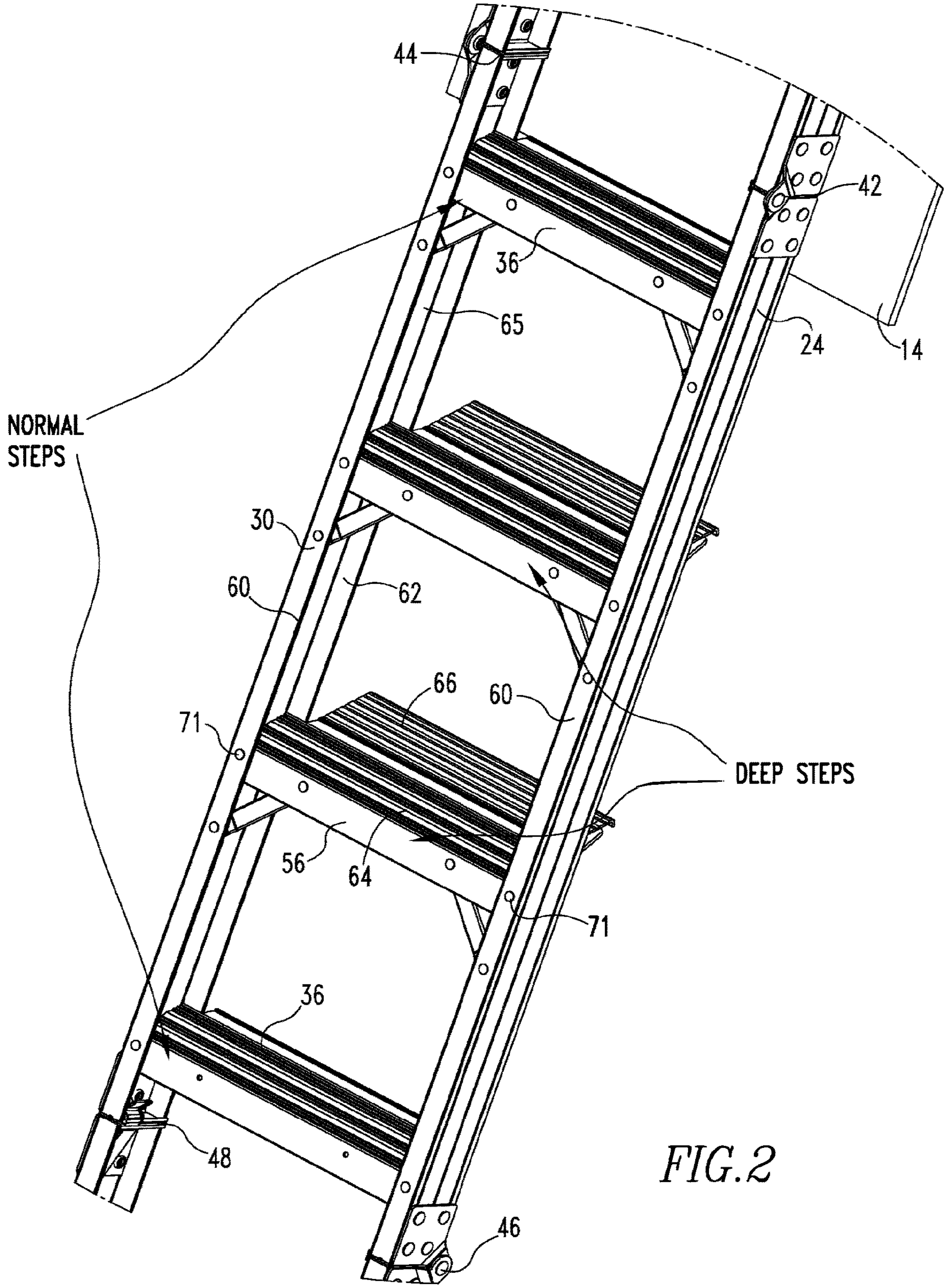
FIG. 2 is a perspective view of the second section of the ceiling ladder.

The deep step 40 may be a one-piece extrusion that has a first flange or first skirt 54 whose right side 58 is fastened to and inside of a front flange 60 of the second right rail and whose left side 59 is fastened to an inside of a front flange 60 of the second left rail, as shown in FIGS. 2 and 5. The one-piece extrusion may have a front horizontal portion that extends essentially at a right angle from a top of the first flange 54, a second flange or second skirt 56 which extends essentially at a right angle down from the front horizontal portion and whose right side 58 is fastened to an inside of a rear flange 62 of the second right rail and whose left side is fastened to an inside of a rear flange 62 of the second left rail, as shown in FIGS. 3, 4B and 5. The extrusion may have a rear horizontal portion 66 that extends from the first horizontal portion 64 in a coplanar manner and from the rear flange 62 and essentially at a right angle, and between and behind the second right rail and the second left rail, with the rear horizontal portion 66 having a length which is shorter than a length of the front horizontal portion and a length of the second flange 56.

The deep step 40 may have a lip 68 which extends down from the rear of the rear horizontal portion 66. The first brace 50 may be attached to the second flange 56 and the rear horizontal portion 66 adjacent to the second right rail, and the second brace 52 is attached to the second flange 56 and the rear horizontal portion 66 adjacent the second left rail, with the lip 68 covering over where the first and second braces 50, 52 attached to the rear horizontal portion 66.

Figure 4A:
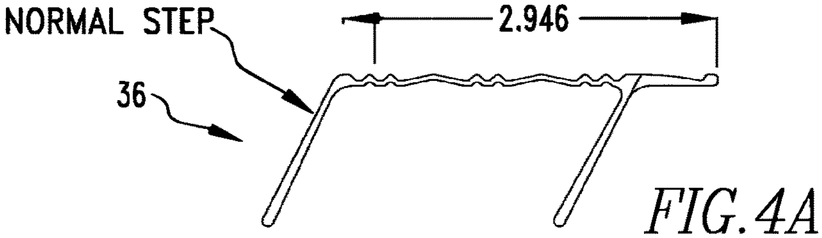
FIG. 4A is a side view of a normal step.
Figure 4B:
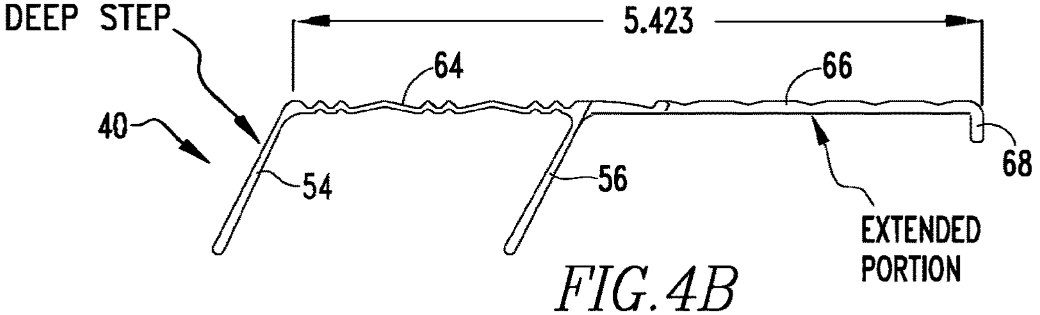
FIG. 4B is a side view of a deep step.

For a normal step, as shown in FIG. 4A, the standard width is between 2.5 inches and 3.25 inches and preferably 2.946 inches. For the deep step 40, as shown in FIG. 4B, the width is between 4.5 inches and 6.5 inches, and preferably 5.423 inches. The deep step 40 can support at least 300 lbs., and is made of aluminum. The front horizontal portion and the rear horizontal portion 66 can have grooves to provide further traction for a user standing on the deep step 40. The thickness of the deep step 40 is between 1/16 inch and 1/4 inch and preferably about 1/8 inch. The rear horizontal portion 66 has a shorter length than the front horizontal portion so that it can extend between and through the second right rail and the second left rail. The front flange 60 and the rear flange 62 of the deep step 40 have fastener holes through which fasteners, such as rivets, are inserted to fix the deep step 40 to the second right rail and the second left rail. The braces may be welded or brazed or soldered to the rear flange 62 and the rear horizontal portion 66. Bracket 73, as shown in FIG. 1 and FIG. 6, fix the top section 16 to the door 14, as is well known in the art.

The present invention pertains to a deep step 40 for a ceiling ladder 10, as shown in FIGS. 1, 3, 4B and 5. The ceiling ladder 10 having a plurality of sections with a top section 16 rotatably attached to the ceiling and a second section 18 rotatably attached to the top section 16. The second section 18 having a plurality of steps attached to a second right rail and a second left rail of the second section 18, with the deep step 40 being one of the plurality of steps. The deep step 40 preferably is one-piece, and is preferably an aluminum extrusion, but could also be made of plastic, comprising a first flange 54 whose right side 58 is fastened to and inside of a front flange 60 of the second right rail and whose left side is fastened to and inside of a front flange 60 of the second left rail. The one-piece extrusion comprises a front horizontal portion that extends essentially at a right angle from a top of the front flange 60. The one-piece extrusion comprises a second flange 56 which extends essentially at a right angle down from the front horizontal portion and whose right side 58 is fastened to an inside of a rear flange 62 of the second right rail and whose left side is fastened to an inside of a rear flange 62 of the second left rail. The one-piece extrusion comprises arear horizontal portion 66 that extends from the front horizontal portion in a coplanar manner and from the second flange 56 at essentially a right angle, and between and behind the second right rail and the second left rail, with the rear horizontal portion 66 having a length which is shorter than a length of the front horizontal portion and a length of the second flange 56.

The present invention pertains to a method for placing objects above a ceiling 11 from a floor 15. The method comprises unfolding a plurality of sections of a ladder 10 having steps, which is attached to the ceiling 11, so a user can climb the ladder 10 to above the ceiling 11 from the floor 15. There is the step of a user climbing the ladder 10 and standing on a deep step 40 of the ladder 10 with an object, which is located between about 2 feet and 5 feet above the floor and below the ceiling. The deep step 40 having a width that is at least 1.5 inches longer than a width of other steps of the ladder 10. There is the step of the user placing the object above the ceiling while standing on the deep step 40. There is the step of the user climbing down off the ladder 10 onto the floor. There is the step of the user folding the sections of the ladder 10 together into a retracted position. There is the step of moving the sections of the ladder 10 in the folded position above the ceiling.

FIG. 1 shows a perspective view of an open and fully extended ceiling ladder 10. Typically, attic or ceiling ladders 10 have a frame 12, a door 14 hinged to the frame 12 and ladder sections which are connected to each other by hinges. In this case, there is an upper or top section 16, mid or second section 18 and lower or third section 20. It should be noted that the ladder 10 may only have two sections, the top and the second sections.

FIG. 2 shows a close-up of the second section 18 of the ladder 10. The first and fourth steps of this section are normal steps 36 while the second and third steps are deep steps 40. Users over a wide range of heights are most likely to pause and stand one or the other of those two deep steps 40 while lifting articles up into or down from the attic.

FIG. 3 shows a side view of the second section 18 of the ladder 10. The difference in depth between a normal step 36 and a deep step 40 is apparent. A deep step 40 allows the user to have a larger portion of their "footprint" supported by the step. Also, the deeper step allows the user to maintain solid footing while swiveling left or right as needed when passing containers to or from the attic.

FIGS. 4A and 4B are a comparison of the size and shape of a normal step 36 and a deep step 40. The ladder 10 steps shown are made from aluminum extrusions. The deep step 40 could be made from a single extrusion having an extended portion as shown. Alternately, the extended portion could be a separate piece of material permanently fastened to a normal step extrusion.

FIG. 5 shows step braces fastened to the underside of the deep steps 40. These braces support the extended portion, also referred to here as the rear horizontal portion 66 of the deep step 40.

FIG. 6 shows the ceiling ladder 10 with its top (upper), second (mid), and third (lower) sections folded up prior to closing the door 14. The steps on all three sections are spaced and positioned so that the deep steps 40 will not run into the normal steps 36 when the sections are folded. Because of this, the overall size of the folded ceiling ladder 10, and thus the shipping size of the product package, has not increased due to the presence of deep steps 40.

When folding the ladder 10 into the folded position, the user would lift the second and third sections so the second section rotates about the first hinge 42 and the second hinge 44 clockwise tour word and over the top section 16 and the third section 20 is rotated around the third hinge 46 ¼ inch 48 counterclockwise toward the underside of the second section 18 until the rails of the third section 20 contact the rails of the second section 18 and the third section 20 is on top of the second section 18 as the rails of the second section 18 contact the rails of the top section 16, forming a rectangular shaped sandwich, as shown in FIG. 6.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A ladder comprising:
- a first rail;
- a second rail, the second rail spaced from and parallel to the first rail;
- a deep step coupled to the first rail and the second rail, the deep step including a first portion disposed within a footprint of the first rail and the second rail and a second portion projecting beyond the first rail and the second rail, the first portion including a first standing surface with a first skirt and a second skirt depending from the first standing surface, the second portion including a second standing surface that is coplanar with the first standing surface, the second portion having a proximal edge coupled to the first portion, a distal edge opposite the proximal edge, a first side edge, and a second side edge opposite the first side edge;
- a first arm extending from the second skirt to the second portion adjacent to the distal edge, the first arm disposed adjacent to the first side edge; and
- a second arm extending from the second skirt to the second portion adjacent to the distal edge, the second arm disposed adjacent to the second side edge;
- wherein the first arm and the second arm are directly coupled to the second skirt.

2. The ladder of claim 1, wherein the first arm is directly coupled to the second skirt at a first attachment point and the second arm is directly coupled to the second skirt at a second attachment point, the second attachment point discrete from the first attachment point.

3. The ladder of claim 2, wherein the first attachment point is aligned with the first side edge of the second portion and the second attachment point is aligned with the second side edge of the second portion.

4. The ladder of claim 1, wherein the first rail has a first front flange spaced from a first rear flange by a first web, and the second rail has a second front flange spaced from a second rear flange by a second web, the first portion having a first length extending from the first web to the second web, the second portion having a second length extending from the first side edge to the second side edge, the first length greater than the second length.

5. The ladder of claim 1, wherein the second portion having a proximal edge coupled to the first portion and the first portion has a first depth extending from the first skirt to the second skirt and the second portion has a second depth extending from the proximal edge to the distal edge, the second depth greater than the first depth.

6. The ladder of claim 1, wherein the distal edge of the second portion includes a lip depending therefrom, the first arm and the second arm coupled to the first portion immediately adjacent to the lip.

7. The ladder of claim 1, wherein the ladder has a folded configuration and an unfolded configuration, and wherein the deep step is located between about 2 feet and 5 feet from a floor when the ladder is in an unfolded configuration.

8. The ladder of claim 1, wherein the first portion and the second portion are separate pieces of material.

9. The ladder of claim 1, wherein the first rail has a first front flange spaced from a first rear flange by a first web and the second rail has a second front flange spaced from a second rear flange by a second web, wherein the first rail and the second rail have a rail periphery defined by a line extending from the first front flange to the second front flange, a line extending from the first rear flange to the second rear flange, the first web, and the second web, and wherein an entirety of the first portion is disposed with the rail periphery.

10. The ladder of claim 9, wherein a majority of the second portion extends beyond the rail periphery.

11. The ladder of claim 1 wherein the first arm has a channel and the second arm has a channel to strengthen the first and second arms.

12. A ladder comprising:

a rail assembly including a first rail, a second rail, and a plurality of steps coupled to the first rail and the second rail, the second rail spaced from and parallel to the first rail; and at least one step of the plurality of steps including an extension that projects from the at least one step beyond the rail assembly, the at least one step having a skirt depending therefrom, the extension including a tread portion with a proximal edge coupled to the skirt, a distal edge opposite the proximal edge, a first side edge, and a second side edge, the extension supported at least in part by a first arm and a second arm, the first arm coupled to the extension adjacent to a junction of the first side edge and the distal edge, the second arm coupled to the extension adjacent to a junction of the second side edge and the distal edge;

wherein the first arm and the second arm are directly coupled to the skirt of the at least one step.

13. The ladder of claim 12, wherein the proximal edge of the extension includes a first lip depending therefrom, and wherein the distal edge of the extension includes a second lip depending therefrom.

14. The ladder of claim 13, wherein the first lip is coupled to the skirt of the at least one step.

15. The ladder of claim 12, wherein the first arm includes a first flange portion and a second flange portion, the first flange portion coupled to the tread portion of the extension, and the second flange portion coupled to the skirt of the at least one step.

16. The ladder of claim 15, wherein the second arm includes a first flange portion and a second flange portion, the first flange portion coupled to the tread portion of the extension, and the second flange portion coupled to the skirt of the at least one step.

17. The ladder of claim 12 wherein the first arm has a channel and the second arm has a channel to strengthen the first and second arms.

18. A ladder comprising:

a first rail;

a second rail, the second rail spaced from and parallel to the first rail;

a deep step coupled to the first rail and the second rail, the deep step including a first portion disposed within a footprint of the first rail and the second rail and a second portion projecting beyond the first rail and the second rail, the first portion including a first standing surface with a first skirt and a second skirt depending from the first standing surface, the second portion including a second standing surface that is coplanar with the first standing surface, the second portion having a proximal edge coupled to the first portion, a distal edge opposite the proximal edge, a first side edge, and a second side edge opposite the first side edge;

a first arm extending from the second skirt to the second portion adjacent to the distal edge, the first arm disposed adjacent to the first side edge; and a second arm extending from the second skirt to the second portion adjacent to the distal edge, the second arm disposed adjacent to the second side edge;

wherein the first arm has a channel and the second arm has a channel to strengthen the first and second arms.

* * * * *